June 4, 1935.  H. D. HOEKSTRA  2,003,885

RETRACTABLE LANDING GEAR

Filed March 24, 1933

INVENTOR.
HAROLD D. HOEKSTRA.
BY
ATTORNEYS.

Patented June 4, 1935

2,003,885

UNITED STATES PATENT OFFICE 2,003,885

RETRACTABLE LANDING GEAR

Harold D. Hoekstra, Kenmore, N. Y.

Application March 24, 1933, Serial No. 662,418

12 Claims. (Cl. 244—2)

This invention relates to improvements in retractable landing gears for aircraft.

The invention deals particularly with airplanes having wings extending out from a fuselage, and wherein a pair of landing gear units are adapted to be attached to the lower surfaces of said wing, each landing gear of the pair being located on opposite sides of the fuselage. Each landing gear of the pair is substantially the same as the other, so a description of one will suffice for both. The landing gear may also be applied to that type of aircraft wherein engine nacelles are mounted on the lower wing of the aircraft, and also to tail wheel installations in the rearward end of the fuselage of an aircraft.

Briefly, the landing gear unit comprises one or more forwardly extending struts hinged to a rearward portion of the under side of an aircraft wing, such struts carrying at their forward ends, a wheel fork and a landing wheel, the wheel and fork being capable of movement from an extended position below the wing to a retracted position within suitable recesses formed in a forward portion of the wing. Retracting and extending mechanism comprises a strut pivoted to a forward portion of the wing and hinged to the wheel fork, said strut being translatable with respect to the wing to draw the wheel up within said recess, or to lower it below the wing. A particular feature of the invention is the geometric arrangement of the struts, allowing the principal landing gear struts to lie adjacent the surfaces of the wing and substantially in line with the slipstream passing over the aircraft, when the landing gear is retracted. In the extended positions, however, said struts are tilted at angles to the wing surfaces so that landing stresses imposed upon them will be most efficiently transmitted to structural members within the wing. Shock absorbers and resilient taxiing devices are coordinated with the retracting strut. The struts are so arranged that no interference is caused by them in either extended or retracted positions with the normal structural bracing within the wing, yet, their arrangement permits total retraction of the landing wheel within the wing.

Alternative arrangements of the shock absorbing and taxiing mechanism are provided, including hydraulic, pneumatic, or mechanical devices.

Objects of the invention are:

(a) To provide a simple, strong and light weight retractable landing gear for aircraft;

(b) To provide a retractable landing gear structure including struts which will not interfere with the normal structure of the aircraft;

(c) To provide a retractable landing wheel mechanism having a geometric arrangement of the landing gear struts to permit the use of the design for normal forwardly located landing gears or for tail wheels;

(d) To provide hinged struts for a retractable landing gear, which, when retracted, lie substantially in or adjacent to the outer surfaces of the aircraft, and which by their organization, permit the attached landing wheel to be carried wholly within the aircraft;

(e) To provide a shock absorbing retracting strut for landing gears capable of pivotal and translational movement;

(f) To provide a retracting member for a landing gear adapted to lie outside of the aircraft surface, visible to the aircraft crew, when extended, and to lie within the aircraft, minimizing parasite drag, when the landing gear is retracted;

(g) To provide a retracting strut arranged to partially balance the landing gear in any position of extension or retraction, allowing the application of a minimum amount of power for extension or retraction of the gear;

(h) To provide a retracting strut which, in its extended position, projects substantially vertically above a portion of the aircraft and which, in its retracted position, lies close to or within the aircraft, substantially parallel to the longitudinal axis thereof;

(i) To provide shock absorbing and taxiing means coordinated with a landing gear retracting mechanism;

(j) To provide a positive mechanically operated means for retracting a landing gear, said means forming part of the landing gear structure and cooperating with a shock absorbing and resilient taxiing device;

(k) To provide practicable alternative forms of hydraulic or pneumatic retracting mechanism, either of which is coordinated with the shock absorbing and taxiing system.

Further objects will be apparent from a reading of the annexed specification and claims, and from a consideration of the drawing, in which similar numbers designate similar parts, and in which:

Figure 1:
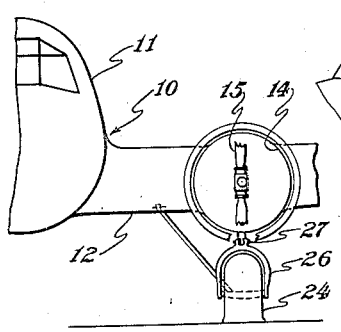
Fig. 1 is a partial front elevation of an airplane including the landing gear of this invention.
Figure 2:
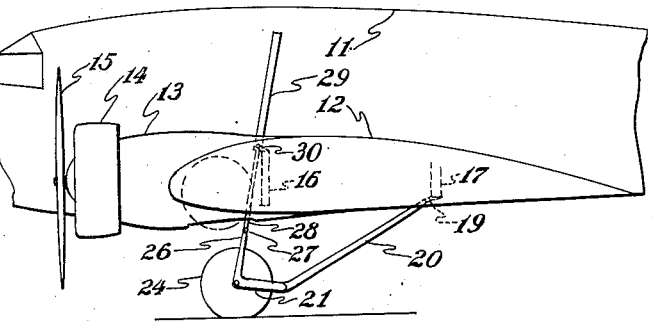
Fig. 2 is a partial side elevation of the airplane, showing the landing gear in its extended position.
Figure 3:
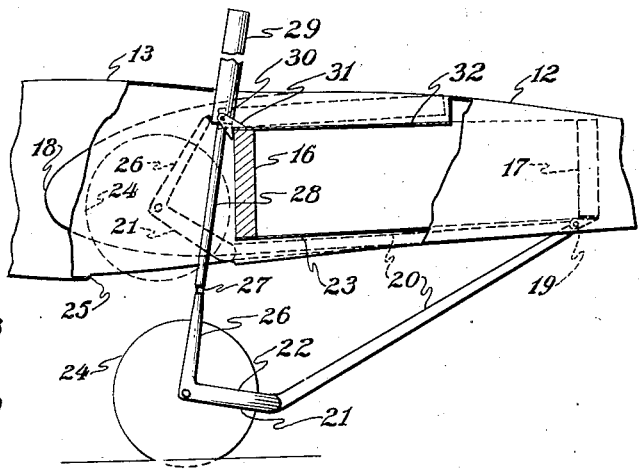
Fig. 3 is an enlargement, partly broken away, of a portion of Fig. 2.

An aircraft 10 includes a fuselage 11 and a wing 12 extending laterally therefrom, a similar wing (not shown) extending from the opposite side of the fuselage. Intermediate the span of the wing is an engine nacelle 13 provided at its forward end with an engine 14 and a propeller 15. The wing 12 includes the conventional spars 16 and 17, the spar 16 being located rearwardly from the leading edge 18 and the spar 17 being rearwardly spaced from the front spar 16. Hinged, as at 19, to the rear spar 17, is a strut 20 carrying at its forward end a wheel fork 21, the tines 22 of the fork being at an angle with the strut 20, so that, when the strut and fork are in a retracted position, the strut lies substantially in line with the lower surface of the wing 12, and so that the fork 21 tilts upwardly around the front of the forward spar 16. A suitable groove 23 is formed in the lower wing surface to receive the spar 20. In the fork tines 22, a wheel 24 is carried for rotation, said wheel, in the retracted position of the landing gear shown by dotted lines in Fig. 3, occupying a space within the leading edge portion of the wing 12, forwardly of the front wing spar 16. A suitable opening 25 is provided in the lower forward portion of the wing to permit the entrance of said wheel. In its extended position, the landing gear occupies a position as indicated by solid lines in Figs. 1, 2 and 3.

Attached rigidly to the fork 21, and substantially at right angles thereto, is a second fork 26, embracing a portion of the wheel 24 and extending from the wheel axis substantially vertically upward when the landing gear is in its extended position. In the retracted position, the upper portion of the fork 26 lies wholly within the wing 12, and assumes a position close to the upper forward edge of the front spar 16. The fork 26 is provided with a hinge 27 at its uppermost point, to which a strut 28 is attached. Said strut 28 is the lower extendible portion of the retracting mechanism, and is adapted to engage within a cylinder 29 to telescope therewithin. The strut, with the landing gear extended, is adapted to transmit the major landing loads to the aircraft, as will be later described in detail. Said cylinder is pivoted for oscillation at 30 to a trunnion yoke 31, said trunnion yoke being rigidly attached to the upper forward edge of the front wing spar 16. By the operation of mechanism, hereafter to be described and adapted to telescope the strut 28 within the cylinder 29, it will be seen that the landing gear in its extended position is held to the wing 12 at the hinge 19 and the pivot 30, the strut 28 assuming a substantially vertical attitude with respect to said wing. Upon telescoping of the strut 28 within the cylinder 29, the unit assembly comprised by the forks 21 and 26, and the strut 20, is drawn to a position within the wing. The hinge 27 approaches the pivot 30, said hinge and pivot being organized so that the strut 28 and cylinder 29, together tilt rearwardly as the landing gear is retracted. In the fully retracted position, the hinge 27 is substantially horizontally aligned with the pivot 30, and lies close thereto, resulting in the fully telescoped cylinder 29 and strut 28, assuming a horizontal position rearwardly of the pivot 30. A suitable recess 32 is formed in the upper surface of the wing within which the cylinder 29 is adapted to lie when the landing gear is fully retracted. It will be seen that in the fully retracted position, the strut 28, the cylinder 29, and the strut 20, all lie adjacent the outer wing surfaces and lie substantially parallel to the air stream passing over the aircraft while it is in flight.

Assuming the aircraft in flight, and the landing gear in its retracted position, it may be desired to extend the landing gear for the purpose of making a landing. The mechanism for extending the strut 28 with respect to the cylinder 29 is actuated, whereupon both the cylinder and the strut begin to tilt forwardly and upwardly, simultaneously with the lowering of the wheel 24 with its strut 20 and forks 21 and 26 below the lower surface of the wing. The air pressure against the wheel and its associated parts, and also the force of gravity acting on these parts will tend to lower the landing gear quickly to an extended position. Simultaneously, however, air pressure and gravity act upon the cylinder 29, tending to prevent the extension of the landing gear. By proper design, such tendencies can be balanced, so that the net effort required to lower the gear is minimized. A similar balancing action occurs when it is desired to retract the landing gear, with consequent minimization of effort necessary for such retraction.

Figure 4:
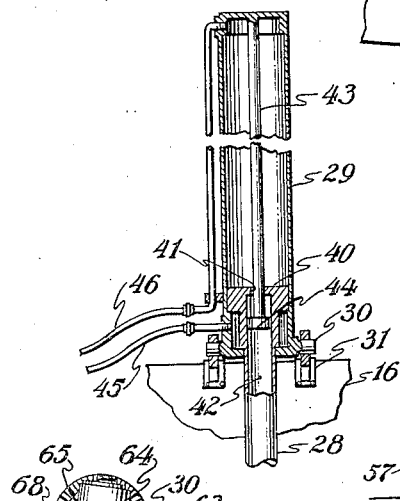
Fig. 4 is a detailed front section showing a pneumatic form of retracting and shock absorbing mechanism for the landing gear.

In Fig. 4, I show a pneumatic arrangement for extending and retracting the strut 28 with respect to the cylinder 29. The strut 28 is provided at its upper end and within the cylinder 29 with a piston 40, said piston having an opening 41 in its upper surface communicating with the hollow interior 42 of the strut 28. A plunger 43 depends from the upper head of the cylinder 29, engaging within the opening 41 and within the hollow 42, and having at its lower end a head 44, the periphery of which is adapted to lie close to the surface of the hollow 42. An air connection 45 is provided to communicate with the lower portion of the cylinder 29 below the piston 40, while an airline 46 is arranged to communicate with the upper end of the cylinder 29 above the piston 40.

The operation of the mechanism is as follows. Admission of air under pressure, through the airline 46, to the upper portion of the cylinder, drives the piston 40, and hence the strut 28 downward, having the effect of extending the retractable landing gear as previously described. Upon extension thereof, a suitable valve in the line 46 is shut off, locking air under pressure within the cylinder 29 above the piston 40. When a landing is made, landing shocks tend to violently compress the strut 28 and to telescope it within the cylinder 29. Such telescoping is resisted by the resilient cushion formed by the compressed air within the cylinder, and is also resisted by the damping effect of the head 44 moving in a suitable fluid contained within the hollow 42 of the strut 28. Impact shocks are largely taken by such hydraulic damping action, while taxiing action, due to the weight of the aircraft on the landing gear, is resisted by the pressure of air within the cylinder.

After take-off, when the aircraft is in flight, the landing gear may be retracted by opening the line 46 to the atmosphere by suitable valves, and by applying compressed air to the airline 45, forcing the piston 40, and hence the strut 28, upwardly within the cylinder 29, the retraction of the landing gear resulting from telescoping of the strut 28 within the cylinder, as previously described.

I do not wish to limit the action of the pneumatic strut above described to the use of compressed air. The principle on which it operates is by pressure differential for extension and retraction of the strut. If it is desired to retract the landing gear, for instance, the airline 45 may be opened to the atmosphere, and suction, produced by engine manifold vacuum or by a suitable venturi exposed to the airstream, may be applied to the line 46 for withdrawing the strut 28 within the cylinder 29; a reversal of atmospheric and less than atmospheric pressure application serving to extend the strut and landing gear.

Figure 5:
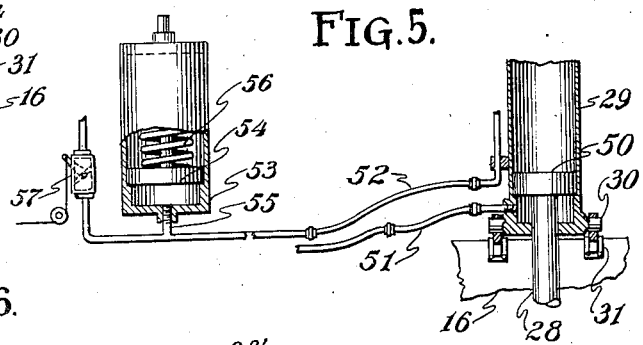
Fig. 5 is a front detail partly in section, showing a hydraulic form of retracting and shock absorbing mechanism.

Fig. 5 shows an embodiment of a hydraulic mechanism for the extension and retraction of the strut 28 within the cylinder 29. The cylinder and strut structure are rather similar to that shown in Fig. 4, except that the piston 50 is solid, and is adapted to move up or down within the cylinder 29 under the influence of fluid pressure, the fluid being admitted selectively through a line 51 communicating with the lower end of the cylinder 29, or through a line 52 communicating with the upper portion of the cylinder 29. Suitable valves, pumps and reservoirs, well known in the art, may be provided to force fluid under pressure through the line 52 to lower the piston 50 and the strut 28, at the same time opening the line 51 to the reservoir to allow the escape of fluid therefrom. Conversely, for raising the strut, the line 52 may be opened to exhaust into the reservoir, while the line 51 is placed in communication with the pump for forcing fluid under pressure to the under side of the piston 50. When the landing gear has been extended by lowering the piston 50 and the strut 28, suitable means for absorbing the landing shocks and taxiing loads are provided in the form of an auxiliary cylinder 53 communicating with the line 52. Within the cylinder 53 is a piston 54 normally held adjacent the fluid entrance 55 by means of a spring 56. When a valve 57 in the line 52 is closed, and when impact or load is imposed on the pistons 50 within the cylinder 29, fluid pressure through the line 52 enters the cylinder 53, tending to force the piston 54 upwardly against the spring 56. Resilient action for the landing gear, as well as cushioning thereof for impact shock, is therefore assumed by the spring 56.

Figures 6, 7:
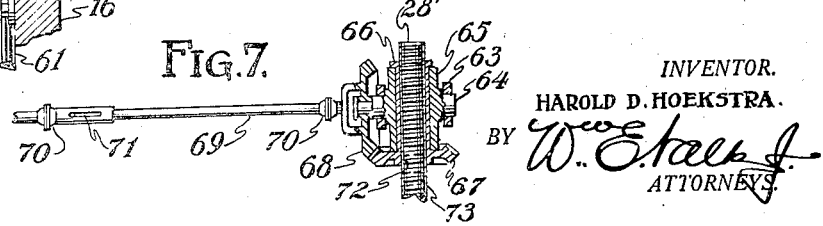
Fig. 6 is a side elevation of a portion of a mechanical form of retracting mechanism.
Fig. 7 is a front section of a portion of the retracting mechanism of Fig. 6.

Figs. 6 and 7 show a mechanical alternative for extending and retracting the landing gear and for translating the strut 28' with respect to the pivot 30 to extend or retract the landing gear as heretofore described. In this embodiment, however, a conventional shock absorber cylinder 61 is rigidly attached to the forward face of the wing spar 16, said cylinder having a plunger 62 vertically slidable therein. Within the cylinder 61 may be incorporated suitable pneumatic or hydraulic shock absorbing mechanism well known to the art. The upper end of the plunger 62 carries a trunnion yoke 63 adapted to hold the pivot 30. Trunnions 64 are formed on a sleeve 65, said sleeve carrying a bushing 66 therewithin for rotation. To the lower end of the bushing 66 is rigidly attached a bevel gear 67 in driving relation to a bevel gear 68 adapted to be turned by a shaft 69 extending within reach of the aircraft crew. The shaft 69 is provided with universal joints 70 and a sliding connection 71, so that, upon movement of the yoke 63 under the influence of ground impact imposed on the strut 28', free turning of the gears 67 and 68 is permitted. It will be seen that by turning the shaft 69, the gears 68 and 67 are likewise turned. The bushing 66, to which the gear 67 is rigidly attached, is provided with internal threads 72 engaging external threads 73 formed on the strut 28'. Turning the shaft 69, then, causes translation of the strut 28' in the bushing 66 and with respect to the pivot 30 to either raise or lower the landing gear according to the direction in which it is turned. The sleeve 65 corresponds generally in its retracting function in the cylinder 29 described in previous embodiments, and the geometric positions of the strut 28' and the sleeve 65 will correspond to the geometric positions assumed by the previously described struts 28 and the cylinder 29 in their various positions of extension or retraction.

When the strut 28' is in its lowermost position, the landing gear is extended, and upon ground contact with the aircraft, landing stresses are imposed thereon. Landing shocks and taxiing forces are transmitted to and are assumed by the shock absorbing mechanism comprising the cylinder 61 and the plunger 62.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft including a wing having front and rear transverse spars, a member hinged to said rear spar, adapted when retracted to extend forwardly adjacent the lower wing surface, and having a forward portion curved upwardly around the front spar so that its forward end terminates substantially within the confines of the leading edge portion of said wing, a wheel pivoted to the forward end of said hinged member, and means for swinging said hinged member and said wheel from a retracted position adjacent to and within said wing to an extended position therebeneath, said means comprising a strut hinged to said member and pivotally connected with said forward spar for movement with respect thereto.

2. In aircraft having a wing structure including front and rear spars spaced respectively from the front and rear wing edges, a retractable landing gear including a forwardly extending strut hinged to the rear spar, said strut being deflected at its forward end and having a wheel carried for rotation adjacent said end, means hinged to the front spar for raising and lowering said strut and wheel to retracted and extended attitudes respectively, the front portion of said wing, forward of said front spar, having a recess within which said wheel and said deflected strut portion may lie when retracted.

3. The combination with an airplane wing having a nacelle mounted thereon, said wing including front and rear transverse spaced spars, of a retractable landing gear including a forwardly extending strut hinged to the rear spar and deflected at its forward end, means connecting the forward end of said strut with said front spar for extension and retraction of said strut, the deflected portion of said strut starting at a distance from said strut hinge substantially equal to the distance between said spars, whereby, upon retraction of said strut, the rearward portion thereof may lie adjacent the lower edges of said spars, and the forward deflected portion of said strut may lie within said wing and nacelle, forward of said front spar and above the lower edge thereof.

4. In aircraft having a retractable landing gear adapted to be retracted within and extended from and below a wing thereof, a member hinged to and organized to extend above said wing when said landing gear is extended below said wing, and means interconnecting said landing gear with said member to move said member within said wing when said landing gear is also moved therewithin.

5. In aircraft having a wing and a retractable landing gear organized to be retracted within and extended from the lower part of said wing, means forming a part of the retracting mechanism adapted to be raised above the upper wing surface when the landing gear is extended, serving as a positive visual indication to the aircraft crew of the state of extension of said landing gear.

6. In aircraft, a wing having front and rear structural members, and a retractable landing gear comprising a plurality of struts hinged to said members, a wheel carried for rotation by said struts, said struts being so geometrically organized that, in a retracted position of said landing gear, certain of said struts lie adjacent the upper wing surface and certain of said struts lie adjacent the lower wing surface, and in an extended position of said landing gear, certain of said struts lie at an angle to and below said wing and certain of said struts lie at an angle to and above said wing.

7. In aircraft having a wing and a retractable landing gear adapted to be extended from said wing, said wing having a structural member and a recess formed in its upper surface, a strut for retracting and extending said landing gear pivoted to and translatable with respect to said wing, said strut, when said landing gear is intermediate its extended and retracted positions, extending above said wing, and when said landing gear is retracted, lying within said recess.

8. In aircraft, in combination, a pivot carried by said aircraft, a shock absorber comprising a pair of members adapted to telescope one within the other, one said member being carried on said pivot for oscillation, said members, in their telescoped position being arranged to lie substantially wholly on the same side of said pivot, and in their extended positions, being adapted to lie substantially wholly at opposite sides of said pivot.

9. In aircraft, in combination, a retracting and shock absorbing mechanism comprising a member fixedly attached to a portion of said aircraft and a member slidable with respect to said first member, a pivot carried by said slidable member, a sleeve carried for oscillation on said pivot, an internally threaded nut rotatable in said sleeve, a threaded strut engaging with said sleeve threads, and means for turning said nut whereby said strut is translated with respect thereto.

10. In aircraft, in combination, a retracting and shock absorbing mechanism comprising a member fixedly attached to a portion of said aircraft and a member slidable with respect to said first member, a pivot carried by said slidable member, means pivoted for oscillation on said pivot, a strut carried by said means and mechanism for translating said strut with respect to said means.

11. In aircraft, in combination, a retractable landing gear, and a shock absorbing and retracting strut therefor, pivoted to said aircraft, comprising a cylinder having openings at each end for the admission and exit of a compressible gas, a piston slidable in said cylinder, a piston strut attached to said piston and extending from said cylinder, said strut being hollow, said piston having an opening to establish communication between said cylinder and said hollow, a member carried by and within said cylinder, passing through said piston opening to said hollow, fluid within the hollow of said piston strut, and means at the inner end of said member adapted to allow the flow of said fluid thereby.

12. In a retractable landing gear for aircraft, in combination, a shock absorbing device including a cylinder mounted rigidly on a part of the aircraft structure, a plunger reciprocable within said cylinder and having a trunnion at one end thereof, and a landing gear strut mounted in said trunnion for oscillation with respect to and for reciprocation with, and with respect to, said plunger.

HAROLD D. HOEKSTRA.